(No Model.)

D. J. HOOPES.
DRIVING MECHANISM FOR BICYCLES.

No. 474,740. Patented May 10, 1892.

WITNESSES:
W. R. Davis
C. Sedgwick

INVENTOR:
D. J. Hoopes
BY Munn & Co
ATTORNEYS

UNITED STATES PATENT OFFICE.

DAVID J. HOOPES, OF PHILADELPHIA, PENNSYLVANIA.

DRIVING MECHANISM FOR BICYCLES.

SPECIFICATION forming part of Letters Patent No. 474,740, dated May 10, 1892.

Application filed July 29, 1891. Serial No. 401,034. (No model.)

*To all whom it may concern:*

Be it known that I, DAVID J. HOOPES, of Philadelphia, in the county of Philadelphia and State of Pennsylvania, have invented a new and Improved Driving Mechanism for Bicycles, of which the following is a full, clear, and exact description.

The object of the invention is to provide a new and improved driving mechanism for bicycles which is simple and durable in construction, permits of easily running the wheel at a high rate of speed, and renders the construction of the bicycle very compact and strong.

The invention consists of a wheel formed with a hollow hub journaled in the bicycle-frame and carrying on its periphery a pinion in mesh with an internal gear-wheel secured on a shaft passing through the said hub and also journaled in the bicycle-frame.

The invention also consists in certain parts and details and combinations of the same, as will be described hereinafter, and then pointed out in the claims.

Reference is to be had to the accompanying drawings, forming a part of this specification, in which similar letters of reference indicate corresponding parts in all the figures.

Figure 1:
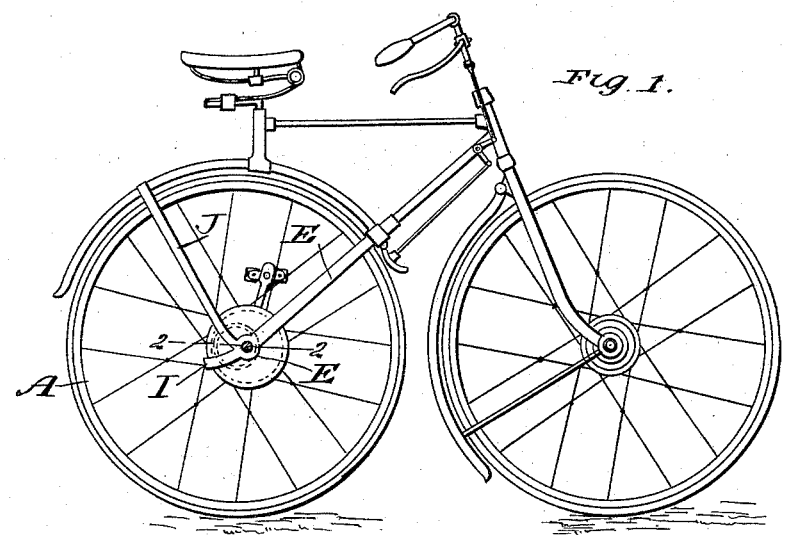
Figure 2:
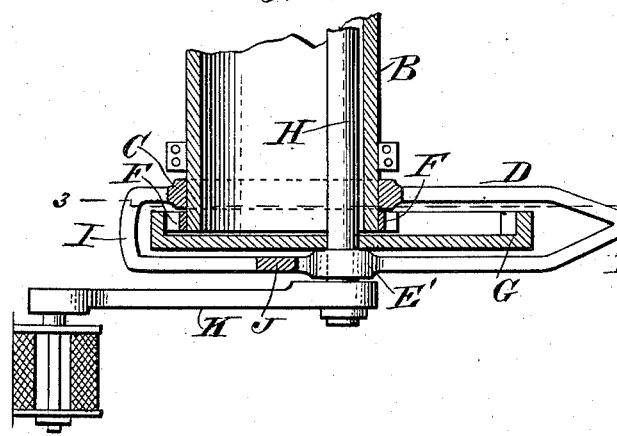

Figure 1 is a side elevation of the improvement as applied to a Safety bicycle. Fig. 2 is an enlarged sectional plan view of the improvement on the line 2 2 of Fig. 1, and Fig. 3 is a sectional side elevation of the same on the line 3 3 of Fig. 2.

The improved wheel A of the bicycle is formed with a hub B, journaled at each end in a bearing C, secured to an arm D of the bicycle-frame E, as is plainly shown in the drawings. On one or both ends of the hub B and on the outside thereof is secured a pinion F, in mesh with an internal gear-wheel G, secured on the shaft H, extending transversely and eccentrically or concentrically through the hub B, the outer ends of the said shaft being journaled in bearings E' on the main frame E.

Figure 3:
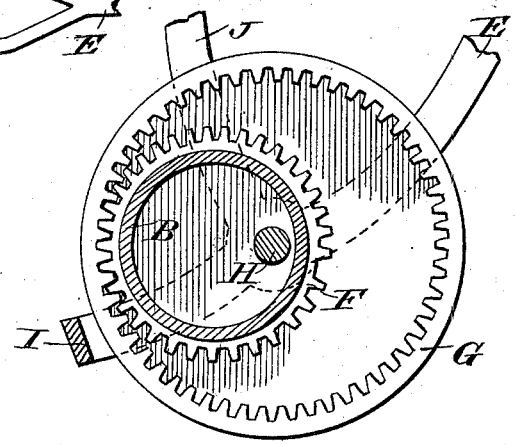

In order to strengthen the bearings C and E', an arm I extends from one bearing to the other around the outside of the wheel G, as is plainly shown in Figs. 2 and 3. From the bearing E' also extends a brace J, connected with or forming part of the main frame of the bicycle.

On the outer ends of the shaft H are held the usual treadles K, adapted to be acted on by the feet of the operator in the usual manner. It will be seen that when the treadles K are actuated a rotary motion is given to the shaft H, which, by its gear-wheel G, imparts a rotary motion to the pinion F, and consequently to the hub B and the wheel A, so that the bicycle is propelled. The web of the internal gear-wheel G extends over the end of the hub B, as is plainly shown in Fig. 2, so that the said hub is protected and dirt cannot pass into the same.

It is understood that the hub B is connected in a suitable manner with the spokes, extending to the rim of the wheel A. It will further be seen that by each rotation of the wheel H the hub B is revolved, so that a high rate of speed is given to the bicycle without great exertion on the part of the operator.

Having thus described my invention, what I claim as new, and desire to secure by Letters Patent, is—

1. In a driving mechanism, the combination, with the hub of a wheel mounted in bearings and provided with a pinion on one end, of a treadle-shaft extending through the hub and provided with an internal gear-wheel meshing with the pinion, substantially as described.

2. In a driving mechanism, the combination, with a hub of a wheel mounted in bearings and provided with a pinion on one end, of a treadle-shaft extending eccentrically through the hub and an internal gear-wheel on the said treadle-shaft and meshing with the pinion of the hub, substantially as herein shown and described.

3. In a driving mechanism, the combination, with the frame E, provided with the bearings C E', of the hub B, mounted in the bearing C and provided with the pinion F on its end, the treadle-shaft H, extending eccentrically through the hub and mounted in the bearing E', and the internal gear-wheel G on the treadle-shaft and meshing with the pinion F, substantially as described.

DAVID J. HOOPES.

Witnesses:
CLAYTON STOKES,
THEO. H. MCCALLA.